(12) United States Patent
Muller et al.

(10) Patent No.: US 12,162,213 B2
(45) Date of Patent: Dec. 10, 2024

(54) ADDITIVE MANUFACTURING METHOD FOR PRODUCING A SILICONE ELASTOMER ITEM

(71) Applicant: Elkem Silicones France SAS, Lyons (FR)

(72) Inventors: Mickael Muller, Offendorf (FR); Jean-Marc Frances, Meyzieu (FR); Perrine Theil, Saint-Pierre de Chandieu (FR); Geoffray Meffre, Lyons (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 261 days.

(21) Appl. No.: 17/614,535

(22) PCT Filed: May 29, 2020

(86) PCT No.: PCT/EP2020/064985
§ 371 (c)(1),
(2) Date: Nov. 28, 2021

(87) PCT Pub. No.: WO2020/239982
PCT Pub. Date: Dec. 3, 2020

(65) Prior Publication Data
US 2022/0219386 A1 Jul. 14, 2022

(30) Foreign Application Priority Data
May 29, 2019 (FR) .................................... 1905722

(51) Int. Cl.
| | | |
|---|---|---|
| C08F 2/46 | (2006.01) |
| B29C 64/124 | (2017.01) |
| B33Y 10/00 | (2015.01) |
| B33Y 70/00 | (2020.01) |
| C08F 2/48 | (2006.01) |
| C08F 2/50 | (2006.01) |
| C08G 77/04 | (2006.01) |
| C08G 77/14 | (2006.01) |
| C08G 77/20 | (2006.01) |
| C08K 3/36 | (2006.01) |
| C08K 5/00 | (2006.01) |
| C08L 83/04 | (2006.01) |
| C09D 7/61 | (2018.01) |
| C09D 183/06 | (2006.01) |
| B29K 83/00 | (2006.01) |

(52) U.S. Cl.
CPC ............ B29C 64/124 (2017.08); B33Y 10/00 (2014.12); B33Y 70/00 (2014.12); C08G 77/14 (2013.01); C08K 3/36 (2013.01); C08K 5/0025 (2013.01); C09D 7/61 (2018.01); C09D 183/06 (2013.01); B29K 2083/00 (2013.01); B29K 2083/005 (2013.01); B29K 2995/007 (2013.01); B29K 2995/0077 (2013.01)

(58) Field of Classification Search
CPC ... B29C 64/124; B29C 64/129; B29C 64/135; B29K 2083/00; B33Y 10/00; B33Y 70/00; C08F 2/46; C08F 2/48; C08F 2/50; C08G 77/04; C08G 77/20; C08G 77/70; C08K 5/0025; C08L 83/04
USPC ......... 264/331.11, 401, 494; 522/25, 26, 27, 522/28, 30, 31, 32, 50, 53, 63, 65, 99, 522/148, 172; 525/474, 477
See application file for complete search history.

(56) References Cited

U.S. PATENT DOCUMENTS

| | | | |
|---|---|---|---|
| 5,236,637 A | 8/1993 | Hull | |
| 5,639,413 A * | 6/1997 | Crivello ............... | B29C 64/135 264/401 |
| 7,105,584 B2 | 9/2006 | Chambers et al. | |
| 2002/0068805 A1* | 6/2002 | Futami ................. | C08F 265/08 523/342 |
| 2002/0137870 A1* | 9/2002 | Crivello ............... | C08G 77/50 528/10 |
| 2007/0049652 A1* | 3/2007 | Ito ....................... | B33Y 70/00 522/148 |
| 2008/0176086 A1 | 7/2008 | Irifune | |
| 2010/0304088 A1* | 12/2010 | Steeman ............... | C08G 59/68 264/401 X |
| 2017/0312729 A1 | 11/2017 | Liu et al. | |
| 2018/0370125 A1 | 12/2018 | Rolland et al. | |
| 2019/0233670 A1 | 8/2019 | Matsumoto et al. | |

FOREIGN PATENT DOCUMENTS

| | | |
|---|---|---|
| CN | 108250838 A | 7/2018 |
| JP | H08-183055 A | 7/1996 |
| KR | 10-2019-0022732 A | 3/2019 |
| WO | 02/42388 A1 | 5/2002 |

(Continued)

OTHER PUBLICATIONS

Thomson Scientific Abstract XP-002799386 of Hu et al., "Ink Composition Comprises Polymerizable or Crosslinked Silicone Resin, Thixotropic Agent and Optionally Filler," CN 20181025673 (Jan. 11, 2018).

(Continued)

Primary Examiner — Leo B Tentoni
(74) Attorney, Agent, or Firm — WHDA, LLP

(57) ABSTRACT

The invention relates to an additive manufacturing process for producing a silicone elastomer item. In particular, the invention relates to an additive manufacturing method for producing a silicone elastomer item from a photocrosslinkable silicone composition. The invention also relates to a photocrosslinkable silicone composition.

11 Claims, No Drawings

(56) References Cited

FOREIGN PATENT DOCUMENTS

| WO | 03/016403 A1 | 2/2003 |
| WO | 2013/140601 A1 | 9/2013 |
| WO | 2014/126837 A2 | 8/2014 |
| WO | 2015/197495 A1 | 12/2015 |
| WO | 2016/181149 A1 | 11/2016 |

OTHER PUBLICATIONS

Thomson Scientific Abstract XP-002797855 of Saito et al., "Silicon-containing Curable Resin Composition Used for e.g., Display Material, Comprises Epoxy Siloxane Compound Containing Epoxy-containing Groups Per Molecule, Epoxy Siloxane Compound and Epoxy Curable Compound," WO 2013140601 (Sep. 26, 2013).

* cited by examiner

ADDITIVE MANUFACTURING METHOD FOR PRODUCING A SILICONE ELASTOMER ITEM

TECHNICAL FIELD

The invention relates to an additive manufacturing process for producing a silicone elastomer item. In particular, the invention relates to an additive manufacturing method for producing a silicone elastomer item from a photocrosslinkable silicone composition. The invention also relates to a photocrosslinkable silicone composition.

TECHNOLOGICAL BACKGROUND

Nowadays, additive manufacturing is of greatly growing importance and has a phenomenal growth potential due to the multitude of possible commercial applications. To allow its generalization of its use, it is essential to widen the range of materials that can be used with an additive manufacturing machine.

In particular, silicone as a printing material is one of the most promising materials for additive manufacturing due to its numerous advantages such as flexibility, biocompatibility, insulating properties for electrical and electronic components, and good chemical, temperature and weather resistance.

Among the additive manufacturing techniques, mention can be made of photopolymerization in a tank (vat photopolymerization). This technique makes it possible to manufacture an object in successive layers, each layer standing for a cross section of the object to be manufactured. It is based on the use of an irradiation source which makes it possible to selectively crosslink, at the desired locations, a photocrosslinkable composition which is in a tank. The composition will then solidify to form a thin crosslinked layer, and the object can be manufactured by superimposing several crosslinked layers.

Various processes are used for photopolymerization in a tank, such as laser stereolithography (SLA) printing, digital light processing (DLP) 3D printing, and continuous liquid interface production (CLIP).

The SLA process is based on the use of a laser as an irradiation source. The laser is focused on the surface of the photocrosslinkable composition and traces a cross section of the 3D object. In general, two motors called galvanometers, one on the X-axis and the other on the Y-axis, operating at high speed, direct the laser beam onto the printing area, thereby solidifying the composition on its way. In this process, the object is broken down into series of points and lines, layer by layer. This technique is for example described in document WO2015/197495.

In the DLP process, a digital screen projector projects a single image of each layer over the entire surface of the photocrosslinkable composition. As the projector has a digital screen, the image of each layer is a set of square pixels, each layer then being comprised of small rectangular bricks called voxels. This technique is for example described in document WO2016/181149. The DLP process allows achieving faster printing times for some parts because each layer is exposed all at once instead of being drawn with a laser. Although faster than the SLA process, the DLP process involves making trade-offs between resolution and the surface finish quality, whether for printing large parts or several smaller parts but with many details.

Another photopolymerization technique in a tank has also been developed in recent years: continuous liquid interface production (CLIP). This technique is also based on the use of an irradiation source to selectively crosslink a photocrosslinkable composition. However, unlike the two previous techniques, the CLIP process is performed out layer by layer but continuously thanks to the constant presence of a liquid interface. The CLIP process therefore allows much faster printing than with the SLA or DLP processes. This technique is for example described in document WO20141126837.

Document US 2017/0312729 describes a photopolymerization method, in a tank, using a liquid silicone composition which can be photocrosslinked into an elastomer. This composition comprises a siloxane comprising an alkenyl group, a siloxane comprising a hydride and a photoactivable catalyst. This composition is crosslinkable by a polyaddition reaction. The problem with this technology based on polyaddition is that the reaction catalysis is not instantaneous and that the product often requires a post-curing step, that is to say a post processing heating step.

Other types of silicone composition can be crosslinked into an elastomer. Document WO 2003/016403 describes photocrosslinkable silicone compositions comprising acrylate functionalities. However, this type of composition is not compatible with all the crosslinking methods in a tank, because this reaction is inhibited by the oxygen in the ambient air.

Silicone elastomer compositions of the "dual cure" type containing chemical functions allowing both UV light and moisture crosslinking have also been described in literature, for example in document U.S. Pat. No. 7,105,584. However, the dual-cure compositions show difficulties in crosslinking in depth and, moreover, volatile products resulting from humidity crosslinking limit the range of applications. It is therefore more difficult to implement them in a tank photopolymerization method.

There is therefore a need to provide an improved tank photopolymerization method to produce silicone elastomer item.

TECHNICAL PROBLEM

In this context the present invention aims to satisfy at least one of the following objectives.

One of the essential purposes of the invention is to provide an additive manufacturing method for producing a silicone elastomer item.

One of the essential purposes of the invention is to provide an additive manufacturing method for producing a silicone elastomer item by photopolymerization in a tank.

One of the essential purposes of the invention is to provide an additive manufacturing method for producing a silicone elastomer item by photopolymerization in a tank, which does not require a post-curing step.

One of the essential purposes of the invention is to provide an additive manufacturing method for producing a silicone elastomer item, which can be easily implemented.

One of the essential purposes of the invention is to provide an additive manufacturing method for producing a silicone elastomer item having good elastomeric properties and good mechanical properties.

One of the essential purposes of the invention to provide an additive manufacturing method for producing a silicone elastomer item from a photocrosslinkable silicone composition.

One of the essential purposes of the invention is to provide a silicone composition photocrosslinkable in silicone elastomer.

BRIEF DESCRIPTION OF THE INVENTION

The invention relates in the first place to an additive manufacturing method for producing a silicone elastomer item, said method including the following steps:

i. Implementing a photocrosslinkable silicone composition Y and an irradiation source, said photocrosslinkable silicone composition Y comprising:
  a. At least one linear organopolysiloxane A with the general formula (I)

[Chem. 1]

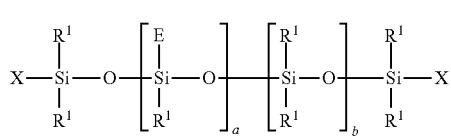

(I)

wherein each group $R^1$ is independently a monovalent radical comprising from 1 to 30 carbon atoms, preferably selected from alkyls having 1 to 8 carbon atoms and aryls having 6 to 12 carbon atoms, and more preferably from the methyl, ethyl, propyl, 3,3,3-trifluoropropyl, xylyl, tolyl and phenyl groups;

E is a group comprising a cationically polymerizable and/or crosslinkable function, preferably an epoxy or vinyloxy function, wherein the cationically polymerizable and/or crosslinkable function is linked to a silicon atom via a divalent radical comprising from 2 to 20 carbon atoms and optionally 1 or several heteroatoms, preferably oxygen;

each group X is independently $R^1$ or E;

$a+b \geq 150$; preferably $2000 \geq a+b \geq 150$;

said organopolysiloxane A having at least 2 groups E comprising a function which can be cationically polymerized and/or crosslinked; and said organopolysiloxane A having a molar content in cationically polymenzable and/or crosslinkable function of less than or equal to 18 mmol/100 g of organopolysiloxane A, preferably less than or equal to 15 mmol/100 g of organopolysiloxane A;

b. Optionally at least one linear organopolysiloxane B with the general formula (I) wherein
  $a+\leq 100$; preferably $1 \leq a+b \leq 100$;
  said organopolysiloxane B having at least 2 groups E comprising a function which can be cationically polymerized and/or crosslinked, preferably an epoxy or vinyloxy function; and
  said organopolysiloxane B having a molar content in cationically polymerizable and/or crosslinkable function of greater than or equal to 20 mmol/100 g of organopolysiloxane B;

c. At least one cationic photoinitiator C;
d. Optionally, a filler D,
e. Optionally a photosensitizer E, and
f. Optionally a photoabsorber F, ii. Selectively irradiating at least a portion of the photocrosslinkable silicone composition Y using the irradiation source to form a portion of the silicone elastomer item; and iii. Repeating step ii) a sufficient number of times to produce the silicone elastomer item.

The presence of a long-chain linear organopolysiloxane A, ie. having at least 150 siloxyl units, an with a low molar content in cationically polymenzable and/or crosslinkable function, makes it possible to manufacture a silicone elastomer item by photopolymerization in a tank. The linear organopolysiloxane A makes it possible to obtain good elastomeric properties, and in particular a high elongation at break.

Moreover, this additive manufacturing method is easy to implement and does not require any post-curing step, that is to say no post processing heating step.

The invention also relates to an item made of silicone elastomer obtained by the method described in the present application.

The invention also relates to a photocrosslinkable silicone composition Y' including:

a. At least 75% in weight of a linear organopolysiloxane A' with the general formula (I)

[Chem. 2]

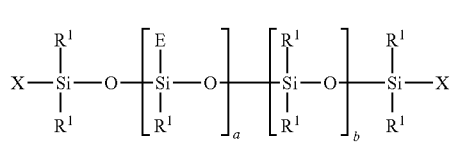

(I)

wherein each group $R^1$ is independently a monovalent radical comprising from 1 to 30 carbon atoms, preferably selected from alkyls having 1 to 8 carbon atoms and aryls having 6 to 12 carbon atoms, and more preferably from the methyl, ethyl, propyl, 3,3,3-trifluoropropyl, xylyl, tolyl and phenyl groups;

E is a group comprising a cationically polymerizable and/or crosslinkable function, preferably an epoxy or vinyloxy function, wherein the cationically polymerizable and/or crosslinkable function is linked to a silicon atom via a divalent radical comprising from 2 to 20 carbon atoms and optionally 1 or several heteroatoms, preferably oxygen; each group X is independently $R^1$ or E;

$a+b \geq 200$; preferably $2000 \leq a+b \geq 200$;

said organopolysiloxane A' having at least 2 groups E comprising a function which can be cationically polymerized and/or crosslinked; and said organopolysiloxane A' having a molar content in cationically polymerizable and/or crosslinkable function of less than or equal to 18 mmol/100 g of organopolysiloxane A', preferably less than or equal to 15 mmol/100 g of organopolysiloxane A';

b. Between 1 and 20% in weight of a linear organopolysiloxane B' with the general formula (I) wherein
  $a+b \leq 150$; preferably $1 \leq a+b \leq 100$;
  said organopolysiloxane B' having at least 2 groups E comprising a function which can be cationically polymerized and/or crosslinked, preferably an epoxy or vinyloxy function; and
  said organopolysiloxane B' having a molar content in cationically polymerizable and/or crosslinkable function of greater than or equal to 20 mmol/100 g of organopolysiloxane B'; and c. At least one cationic photoinitiator C;

The invention also relates to the use of a photocrosslinkable silicone composition Y' for additive manufacturing of a silicone elastomer item.

Finally, the invention also relates to a silicone elastomer obtained by crosslinking the photocrosslinkable silicone composition Y'.

DETAILED DESCRIPTION

Additive Manufacturing Process for Producing a Silicone Elastomer Item

Firstly, the invention relates to an additive manufacturing method for producing a silicone elastomer item, said method including the following steps:

i. Implementing a photocrosslinkable silicone composition Y and an irradiation source, said photocrosslinkable silicone composition Y comprising:
  a. At least one linear organopolysiloxane A with the general formula (I)

[Chem. 3]

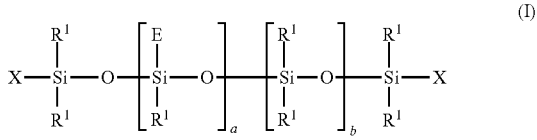

wherein each group $R^1$ is independently a monovalent radical comprising from 1 to 30 carbon atoms, preferably selected from alkyls having 1 to 8 carbon atoms and aryls having 6 to 12 carbon atoms, and more preferably from the methyl, ethyl, propyl, 3,3,3trifluoropropyl, xylyl, tolyl and phenyl groups;
E is a group comprising a cationically polymerizable and/or crosslinkable function, preferably an epoxy or vinyloxy function, wherein the cationically polymerizable and/or crosslinkable function is linked to a silicon atom via a divalent radical comprising from 2 to 20 carbon atoms and optionally 1 or several heteroatoms, preferably oxygen;
each group X is independently $R^1$ or E;
$a+b \geq 150$; preferably $2000 \leq a+b \geq 150$;
said organopolysiloxane A having at least 2 groups E comprising a function which can be cationically polymerized and/or crosslinked; and
said organopolysiloxane A having a molar content in cationically polymerizable and/or crosslinkable function of less than or equal to 18 mmol/100 g of organopolysiloxane A, preferably less than or equal to 15 mmol/100 g of organopolysiloxane A;
  b. Optionally at least one linear organopolysiloxane B with the general formula (I) wherein
$a+b \leq 100$; preferably $1 \leq a+b \leq 100$;
said organopolysiloxane B having at least 2 groups E comprising a function which can be cationically polymerized and/or crosslinked, preferably an epoxy or vinyloxy function; and
said organopolysiloxane B having a molar content in cationically polymerizable and/or crosslinkable function of greater than or equal to 20 mmol/100 g of organopolysiloxane B;
  c. At least one cationic photoinitiator C;
  d. Optionally, a filler D,
  e. Optionally a photosensitizer E, and
  f. Optionally a photoabsorber F, ii. Selectively irradiating at least a portion of the photocrosslinkable silicone composition Y using the irradiation source to form a portion of the silicone elastomer item; and
iii. Repeating step ii) a sufficient number of times to produce the silicone elastomer item.

Generally, all additive manufacturing methods have a common starting point which is a computer data source or a computer program that can describe an object. This computer data source or computer program can be based on a real or virtual object. For example, a real object can be scanned using a 3D scanner and the data obtained can be used to generate the computer data source or the computer program. Alternatively, the computer data source or the computer program can be designed from scratch.

The computer data source or computer program is usually converted to a stereolithography (STL) format file, however, other file formats can be used. The file is typically read by 3D printing software that uses the file and optionally user input to separate the object into hundreds, thousands, or even millions of "layers". Usually, the 3D printing software transfers the instructions to the machine, eg. in the form of G-code, which are read by the 3D printer which then manufactures the objects, usually layer by layer.

Advantageously, the additive manufacturing method is an additive manufacturing method of photopolymerization in a tank, in particular by laser stereolithography (SLA) printing, digital light processing (DLP), or continuous liquid interface production (or CLIP). These technologies and the equipment associated thereto are well known to those skilled in the art, who will know how to choose the appropriate technique and the corresponding 3D printer. These technologies and equipment are for example described in the following documents: WO2015/197495, U.S. Pat. No. 5,236,637, WO20161181149 and WO20141126837.

The irradiation source can be any irradiation source that allows photocrosslinking the photocrosslinkable silicone composition Y. Advantageously, the irradiation source is a light source, preferably an ultraviolet (UV), visible, or infrared (IR) light source. In general, UV light sources have a wavelength between 200 and 408 nm, visible light sources between 400 and 700 nm, and IR light sources have a wavelength greater than 700 nm, fore example between 700 nm and 1 mm, or between 700 and 10,000 nm. The light source can be a lamp or a laser. Preferably, the irradiation source is selected from UV lamps, UV lasers, visible light lamps, visible light lasers, IR lamps and IR lasers. Among the irradiation sources that can be used, mention can be made of mercury lamps which are commonly used in the photopolymerization reactions of silicone compositions. In a particular embodiment of the method, the irradiation source is an LED lamp, preferably an LED lamp having a wavelength of 355, 365, 385 or 405 nm.

The power of the irradiation source can be at least, 1, 10 or 50 mW/cm2. It can be between 1 and 1000 mW/cm2, preferably between 10 and 500 mW/cm2, and more preferably between 50 and 200 mW/cm2.

In a particular embodiment, the irradiation penetration depth (Dp) is less than 500 μm, preferably the penetration depth is between 50 and 500 μm, and more preferably between 100 and 400 μm.

In a specific embodiment, the method does not implement a composition of the dual cure type. In particular, the method does not implement a composition which can be crosslinked by polyaddition.

In a particular embodiment, the method does not implement any post curing step.

Preferably, the photocrosslinkable silicone composition Y is implemented in a tank and the silicone elastomer item is produced on a support, preferably a mobile support. The support can be any type of support. Advantageously, the support is a platform of a 3D printer, such as a mobile platform, or one or several already crosslinked layers of the photocrosslinkable silicone composition Y.

According to a first embodiment of the method, the additive manufacturing method is carried out layer by layer, each layer standing for a cross section of the object to be printed. This first embodiment is particularly suitable for laser stereolithography (SLA) printing, and digital light processing (DLP). In this first embodiment, the irradiation step ii) can include the following sub-steps:
 a. Depositing a layer of the photocrosslinkable silicone composition Y on a support;
 b. Selectively irradiating the layer with an irradiation source to form a first cross section of the silicone elastomer item to be produced;
 c. Depositing an additional layer of photocrosslinkable silicone composition Y on the first cross section produced in step b); and
 d. Selectively irradiating the additional layer to form an additional cross section of the silicone elastomer item to be produced.

The support on which the photocrosslinkable silicone composition Y layer is deposited in step a) can be any type of support. Preferably, it is a mobile support. Advantageously, the support is a platform of a 3D printer, such as a mobile platform. The support can also comprise one or several already crosslinked layers of the photocrosslinkable silicone composition Y.

Preferably, in step d), the additional cross section which is formed adheres to the first cross section of the silicone elastomer item formed in step b).

Advantageously, the thickness of a layer of photocrosslinkable silicone composition Y is between 0.1 and 500 μm, preferably between 5 and 400 μm, preferably between 10 and 300 μm, and more preferably between 10 and 100 μm.

In a particular embodiment, the irradiation duration of the photocrosslinkable silicone composition Y layer is at least 0.001 seconds. Preferably, the irradiation duration is between 0.001 seconds and 1 hour, and more preferably between 0.01 seconds and 5 minutes.

These different settings can be adjusted according to the intended result.

Depositing a layer of photocrosslinkable silicone composition Y can be carried out by moving the support, or using a blade, or doctor blade, which deposits a new photocrosslinkable silicone composition Y layer.

Preferably, in the case in which the irradiation source is a laser (e.g., SLA process) the laser traces the cross section of the silicone elastomer item to be produced, so as to provide selective irradiation, and in the case in which the irradiation source is a lamp (e.g., DLP process), it is a single image of the cross section which is projected onto the entire surface of the photocrosslinkable composition Y.

Two alternatives are possible in this first embodiment: the additive manufacturing can be carried out right side up, or be reversed. These two variants are described in document U.S. Pat. No. 5,236,637.

In a first alternative of this first embodiment, additive manufacturing is carried out right side up: the photocrosslinkable silicone composition Y is contained in a tank and the irradiation source is focused on the photocrosslinkable silicone composition Y surface. The layer which is irradiated is that between the support and the surface of the photocrosslinkable silicone composition Y. In this first alternative, depositing a layer of photocrosslinkable silicone composition Y is carried out by lowering the support into the tank by a distance equal to the thickness of a layer. A blade, or a doctor blade, can then sweep the surface of the photocrosslinkable silicone composition Y, which makes it possible to level it.

In a second alternative of this first embodiment, the additive manufacturing is reversed: the tank comprises a transparent bottom and a non-adhesive surface, and the irradiation source is focused on the transparent bottom of the tank. The layer which is being irradiated is therefore the one located between the bottom of the tank and the support. In this case, the deposition of a photocrosslinkable silicone composition Y layer is carried out by raising the support so as to let the photocrosslinkable silicone composition Y insert itself between the tank bottom and the support. The distance between the tank bottom and the support corresponds to the thickness of a layer.

Advantageously, the additive manufacturing method is an additive manufacturing method by a digital light processing (DLP) photopolymerization in a tank, wherein the additive manufacturing is carried out right side up: the deposition of a photocrosslinkable silicone composition Y layer is carried out by lowering the support in the tank a distance equal to the thickness of a layer, and a blade, or doctor blade, sweeps the surface of the photocrosslinkable silicone composition Y.

According to a second embodiment of the method, the additive manufacturing method is carried out continuously. This second embodiment is particularly suitable for the production by continuous liquid interface production (CLIP) described in document WO2014/126837. In this second embodiment, the irradiation step ii) can comprise the following substeps, taking place simultaneously:
 a. Selectively irradiating at least a portion of the photocrosslinkable silicone composition Y with an irradiation source to form a portion of the silicone elastomer item; and
 b. Moving the part of the silicone elastomer item formed in step a) away from the irradiation source, along the irradiation axis.

Advantageously, in step a), the part of the silicone elastomer item is formed on a support and during step b), it is the support which is simultaneously moved.

Preferably, in this second embodiment, the additive manufacturing is reversed; the tank comprises a transparent bottom, and the irradiation source is focused on the transparent bottom of the tank. Thanks to an oxygen-permeable membrane, the photopolymerization only takes place at the interface between the photocrosslinkable silicone composition Y and the support, the photocrosslinkable composition Y between the bottom of the tank and the interface does not photopolymerize. Thus, it is possible to maintain a continuous liquid interface where the silicone elastomer item is formed by irradiating the photocrosslinkable composition Y and simultaneously moving the part of the silicone elastomer item formed out of the tank.

Once the silicone elastomer item has been obtained, it is possible to rinse it in order to remove the non-crosslinked photocrosslinkable silicone composition Y.

Once the silicone elastomer item has been obtained, it is also possible to carry out additional steps in order to improve the item surface quality. Sandblasting is, for example, a known method for reducing or removing the distinct visible layers. Spraying or coating the silicone elastomer item with an LSR or RTV silicone composition crosslinkable by heating or UV rays can also be used to achieve a smooth appearance. It is also possible to perform surface processing of the item obtained, with a laser.

For medical applications, it is possible to sterilize the obtained silicone elastomer item. Sterilizing the item can be carried out by heating, for example at a temperature above 100° C., either in a dry atmosphere or in an autoclave with steam. Sterilizing can also be carried out by gamma rays, with ethylene oxide, or by electron beam.

The invention also relates to an item made of silicone elastomer obtained by the method described in the present application.

The obtained silicone elastomer item can be a item with simple or complex geometry. It can for example be silicone molds, masks, pipes, anatomical models (functional or non-functional) such as a heart, kidney, prostate, etc., models for surgeons or for teaching, orthotics, prostheses, such as dentures, aligners, mouth guards, or implants of different classes, such as long-term implants, hearing aids, stents, laryngeal implants, etc.

The obtained silicone elastomer item can also be a jack for robotics, a seal, a mechanical part for the automotive or aeronautic industry, a part for electronic devices, a part for encapsulating components, a vibrational insulator, an impact insulator or a sound insulator.

Photocrosslinkable Silicone Composition Y

The photocrosslinkable silicone composition Y implemented in the process includes:

a. At least one linear organopolysiloxane A with the general form formula (I)

[Chem. 4]

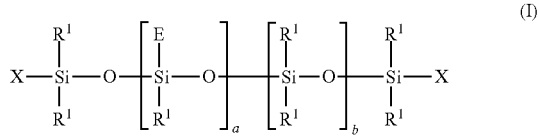

wherein each group $R^1$ is independently a monovalent radical comprising from 1 to 30 carbon atoms, preferably selected from alkyls having 1 to 8 carbon atoms and aryls having 6 to 12 carbon atoms, and more preferably from the methyl, ethyl, propyl, 3,3,3-trifluoropropyl, xylyl, tolyl and phenyl groups;

E is a group comprising a cationically polymerizable and/or crosslinkable function, preferably an epoxy vinyloxy function, wherein the cationically polymerizable and/or crosslinkable function is inked to a silicon atom via a divalent radical comprising from 2 to 20 carbon atoms and optionally 1 or several heteroatoms, preferably oxygen;

each group X is independently $R^1$ or E $a+b \geq 150$; preferably $2000 \geq a+b \geq 150$;

said organopolysiloxane A having at least 2 groups E comprising a function which can be cationically polymerized and/or cross inked, and said organopolysiloxane A having a molar content in cationically polymerizable and/or crosslinkable function of less than or equal to 18 mmol/100 g of organopolysiloxane A, preferably less than or equal to 15 mmol/100 g of organopolysiloxane A;

b. Optionally at least one linear organopolysiloxane with the general formula (I) wherein
   $a+b \leq 100$; preferably $1 \leq a+b \leq 100$;
   said organopolysiloxane B having at least 2 groups E comprising a function which can be cationically polymerized and/or crosslinked, preferably an epoxy or vinyloxy function and
   said organopolysiloxane B having a molar content in cationically polymerizable and/or crosslinkable function of greater than or equal to 20 mmol/100 g of organopolysiloxane B:

c. At least one cationic photoinitiator C;
d. Optionally, a filler D,
e. Optionally a photosensitizer E, and
f. Optionally a photoabsorber F.

By "implementing a photocrosslinkable silicone composition Y", is meant employing a photocrosslinkable silicone composition Y. This photocrosslinkable silicone composition Y can be prepared according to methods known to the person skilled in the art. Advantageously, the photocrosslinkable silicone composition Y is prepared by mixing all the components, eg. manually or in a speed mixer. Once the components are mixed, it is possible to degas the photocrosslinkable silicone composition Y.

The molar content in cationically polymerizable and/or crosslinkable function of the organopolysiloxane A of less than or equal to 18 mmol/100 g of organopolysiloxane A, preferably less than or equal to 15 mmol/100 g of organopolysiloxane A. The molar content in cationically polymerizable and/or crosslinkable function can for example be between 0.5 and 18 mmol/100 g of organopolysiloxane A, or between 1 and 15 mmol 100 g of organopolysiloxane A.

In a particular embodiment, the organopolysiloxane of formula A is an organopolysiloxane of formula (I) where $a+b \geq 200$; preferably $1000 \geq a+b \geq 200$.

Organopolysiloxane A consists of siloxyl units "D" selected from the group consisting of siloxyl units D: $R^1_2SiO_{2/2}$ and $D_E$; $ER^1SiO_{2/2}$, and siloxyl units "M" selected from the group consisting of siloxyl units $M^E:ER^1_2SiO_{1/2}$. The symbols $R^1$ and E are as described above.

The linear organopolysiloxane A preferably comprises 2 groups E comprising a cationically polymerizable and/or crosslinkable function.

Advantageously, the organopolysiloxane A is an organopolysiloxane with the formula (I) wherein a=0. The groups E comprising a cationically polymerizable and/or crosslinkable function are then at the end of the chain and the organopolysiloxane A can have a general formula $M^E D_x M^E$ with $x \geq 150$, preferably $x \geq 200$.

The organopolysiloxane A can be an oil with a dynamic viscosity in the order of 1 to 100,000 mPa·s at 25° C., generally in the order of 10 to 70,000 mPa·s at 25° C., and preferably in the order of 10 to 30,000 mPa·s at 25° C., and even more preferably in the order of 500 to 20,000 mPa·s at 25° C.

All the viscosities in question in this presentation correspond to a dynamic viscosity magnitude at 25° C. called "Newtonian", that is to say the dynamic viscosity which is measured, in a manner known per se, with a Brookfield viscometer at a shear rate gradient low enough for the measured viscosity to be independent of the rate gradient.

The photocrosslinkable silicone composition Y can comprise at least 70% by weight of organopolysiloxane A relative to the total weight of the photocrosslinkable silicone composition Y, preferably between 70 and 99% by weight, and more preferably between 75 and 90% by weight. The photocrosslinkable silicone composition Y can comprise at least 75% by weight of organopolysiloxane A.

The photocrosslinkable silicone composition Y can comprise a linear organopolysiloxane B of general formula (I) wherein +b≤100; preferably 1≤a+b≤100; and said organopolysiloxane B having a molar content in cationically polymerizable and/or crosslinkable function of greater than or equal to 20 mmol/100 g of organopolysiloxane B.

The linear organopolysiloxane B has a shorter chain than the organopolysiloxane A and a higher molar content in cationically polymerizable and/or crosslinkable function. This makes it possible to improve the mechanical properties of the silicone elastomer item obtained at the end of the process, while keeping good elastomeric properties. Indeed, the modulus at break and the hardness of the obtained silicone elastomer item are increased, while keeping a high elongation at break.

The molar content in cationically polymerizable and/or crosslinkable function of organopolysiloxane B is greater than or equal to 20 mmol/100 g of organopolysiloxane B, preferably greater than or equal to 50 mmol/100 g of organopolysiloxane B, and more preferably greater than or equal to 80 mmol/100 g of organopolysiloxane B. The molar content in cationically polymerizable and/or crosslinkable function of the organopolysiloxane B can for example be between 20 and 500 mmol/100 g, or between 50 and 250 mmol/100 g of organopolysiloxane B.

Organopolysiloxane B consists of siloxyl units "D" selected from the group consisting of siloxyl units D: $R^1_2SiO_{2/2}$ and $D_E$: $ER^1SiO_{2/2}$, and siloxyl units "M" selected from the group consisting of siloxyl units $M^E$; $ER^1_2SiO_{1/2}$. The symbols $R^1$ and E are as described above.

The linear organopolysiloxane B preferably comprises 2 groups E comprising a cationically polymerizable and/or crosslinkable function.

In a particular embodiment, the organopolysiloxane B an organopolysiloxane of formula (I) where a+b≤75; preferably 1≤a+b≤75.

Advantageously, the organopolysiloxane B is an organopolysiloxane with the formula (I) wherein a=0. The groups E comprising a cationically polymerizable and/or crosslinkable function are then at the end of the chain and the organopolysiloxane B can have a general for a $M^E D_m M^E$ with x≤100, preferably x≤75.

The organopolysiloxane B can be an oil with a dynamic viscosity in the order of 1 to 100,000 mPa·s at 25° C., generally in the order of 5 to 70,000 mPa·s at 25° C., and preferably in the order of 10 to 1,000 mPa·s at 25° C.

The photocrosslinkable silicone composition Y can comprise between 1 and 20% by weight of the organopolysiloxane B relative to the total weight of the photocrosslinkable silicone composition Y, preferably between 5 and 15% by weight.

The group E cationically polymerizable and/or crosslinkable function is preferably selected among epoxy, vinyloxy, oxetane and dioxolane functions. Advantageously, the group E cationically polymerizable and/or crosslinkable function is an epoxy or vinyloxy function, preferably an epoxy function.

When the polymerizable and/or crosslinkable function by the cationic route of group E is a epoxy function, the groups E of the organopolysiloxane A and/or of the organopolysiloxane B are preferably selected from the following groups:

[Chem. 5]

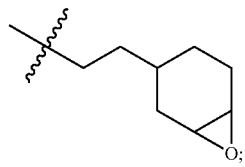

[Chem. 6]

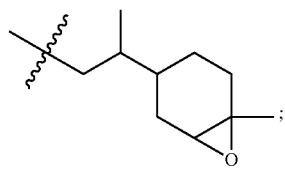

[Chem. 7]

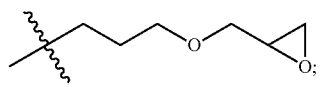

[Chem. 8]

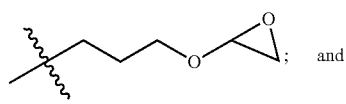
; and

[Chem. 9]

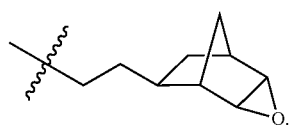

The wavy line stands for where the group E is bonded to a silicon atom of the organopolysiloxane.

When the polymerizable and/or crosslinkable function by the cationic route of group E is a vinyloxy function, the groups E of the organopolysiloxane A and/or of the organopolysiloxane B are of formula (II):

$$-G-O-CH=CH_2 \quad (II)$$

wherein G stands for a divalent radical comprising from 2 to 20 carbon atoms and optionally 1 or several heteroatoms, preferably oxygen.

Preferably, the vinyloxy group is selected from the following groups:

—$(CH_3)_2$—O—CH=$CH_2$;

—O—$(CH_2)_4$—O—C=$CH_2$; and

—$(CH_2)_3$—O—$R^{11}$—O—CH=$CH_2$, wherein $R^{11}$ is a divalent radical selected from $C_1$-$C_{12}$ branched or linear alkylene, and $C_6$-$C_{12}$ arylenes, preferably phenylene, the arylenes being optionally substituted with one, two or three $C_1$-$C_6$ alkyl groups.

Preferably, the organopolysiloxane A and/or the organopolysiloxane B is of formula (III):

[Chem. 10]

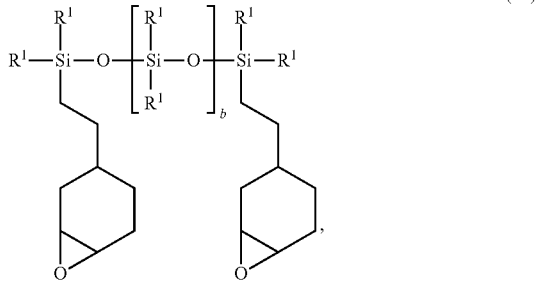
(III)

wherein $R^1$ is as described above, R1 being preferably a methyl group. In the case of organopolysiloxane A, b is ≥150, preferably b≥200, and in the case of organopolysiloxane B, b is ≤100, preferably b≤75.

Advantageously, the cationic photoinitiator C is selected from onium salts, preferably from the group consisting of diaryliodonium salts, aryldiazonium salts, alkoxypyridinium salts, triarylsulfonium salts, sulfonium salts, and mixtures thereof. Preferably, the cationic photoinitiator C is a diaryliodonium salt.

For onium salts, it is the cationic part which is responsible for UV rays absorption; the anionic part, on the other hand, determines the strength of the formed acid and consequently the initiation rate of polymerization. The weaker its nucleophilic property, the faster the photolysis reaction. The various counterions used in cationic photoinitiators can thus be classified according to their reactivity (decreasing): $(C_6F_5)_4B > SbF_6^- >> AsF_6^- > PF_6^- > BF_4^-$. The onium salt can be an onium borate. The onium borate can be selected from those described in document U.S. Pat. No. 7,041,710 B2.

The onium salt is preferably an iodonium borate. Advantageously, the iodonium borate is selected from those:
A) in which the cationic entity of the borate is selected from:
the formula (IV) onium salts;

 (IV)

formula wherein:
the radicals $R^2$, identical or different, stand for a $C_6$-$C_{20}$ aryl radical, or a heteroaryl radical having from 5 to 15 ring atoms,
the $R^3$ radicals, which are identical or different, meet the same definition as $R^2$ or stand for a $C_1$-$C_{30}$ branched or linear alkyl radical, or a $C_2$-$C_{30}$ branched or linear alkenyl radical;
said radicals $R^2$ and $R^3$ being optionally substituted by one or several:
i) $C_1$-$C_{30}$ branched or linear alkyl group,
ii) $OR^{12}$ group,
iii) ketone group —(C=O)—$R^{12}$
iv) ester or carboxylic acid group —(C=O)—O—$R^{12}$,
v) mercapto $SR^{12}$ group,
v) mercapto $SOR^{12}$ group,
vii) $C_2$-$C_{30}$ branched or linear alkenyl group, optionally substituted by one or several $C_1$-$C_{30}$ branched or linear alkyl groups, $OR^{12}$ group, —CN group, and/or —(C=O)—O—$R^{12}$ group;
$R^{12}$ being a radical selected from the group consisting of a hydrogen atom, a $C_1$-$C_{25}$ branched or linear alkyl radical, a $C_6$-$C_{30}$ aryl radical, or an alkylaryl radical in which, the alkyl part is $C_1$-$C_{25}$ branched or linear and the aryl part is $C_6$-$C_{30}$,
viii) nitro group,
ix) chlorine atom
x) bromine atom, etand/or
xi) cyano group,
n is an integer ranging from 1 to v+1, v being the valence of iodine,
m is an integer ranging from 0 to v−1, with n+m=v+1; and
B) whose anionic borate entity has the formula (V):

$[BZ_aR^4{}_b]^-$ (V)

wherein:
a and b are integers such as 0≤a≤3, 1≤b≤4, and a+b=4,
the Z symbols, whether identical or different, stand for
i) a halogen atom selected from chlorine and/or fluorine with 0≤a≤3, or
ii) an OH function with 0≤a≤2, and
the $R^4$ radicals, whether identical or different, stand for:
i) a phenyl radical substituted by at least one electron-withdrawing group such as —$CF_3$, —$OCF_3$, —$NO_2$, CN, —$SO_2R^{14}$, —O(C=O)—$R^{14}$, —O—$C_nF_{2n+1}$, et —$C_nF_{2n+1}$, n being an integer between 1 and 20 or substituted by at least 2 halogen atoms, in particular fluorine, or
ii) an aryl radical containing at least two aromatic rings such as biphenyl, naphthyl, optionally substituted by at least one halogen atom, in particular a fluorine atom or an electron withdrawing group such as —$CF_3$, —$OCF_3$, —$NO_2$, —CN, —$SO_2R^{14}$, —O(C=O—$R^{14}$, —O—$C_nF_{2n+1}$, and —$C_nF_{2n+1}$
$R^{14}$ being —O—$C_nF_{2n+1}$, and —$C_nF_{2n+1}$, n being an integer between 1 and 20.

The borate anion is preferably selected from the group consisting of $[B(C_6F_5)_4]^-$, $[(C_6F_5)_2BF_2]^-$, $[B(C_6H_4CF_3)_4]^-$, $[B(C_6F_4OCF_3)_4]^-$, $[B(C_6H_3(CF_3)_2)_4]^-$, $[B(C_6H_3F_2)_4]^-$, $[C_6F_5BF_3]^-$, and mixtures thereof.

According to a particular embodiment, the iodonium borate is selected from the compounds of formula (VI):

[Chem. 11]

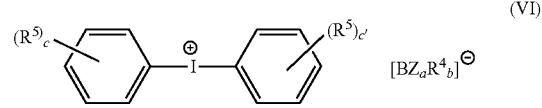
(VI)

wherein:
the symbols $R^5$ and $R^6$ are identical or different, and each stands for a branched or linear alkyl radical having 10 to 30 carbon atoms and preferably 10 to 20 carbon atoms, even more preferably 10 to 15 carbon atoms, even more preferably 10 to 13 carbon atoms and even more preferably 12 carbon atoms,
c and c' are whole numbers, identical or different, ranging from 1 to 5 and preferably c and c' are equal to 1,
Z, a, $R^4$ and b are as described above in formula (V).

According to a specific embodiment, the iodonium borate is selected from the compounds of formula (VII):

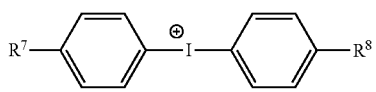

(VII)

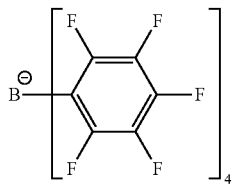

wherein
the symbols $R^7$ and $R^8$ are identical or different, and each stands for a branched or linear alkyl radical having 10 to 30 carbon atoms, preferably having 10 to 20 carbon atoms, and even more preferably 10 to 15 carbon atoms.

According to a preferred embodiment, the iodonium borate is selected from the compounds of formula (VIII)

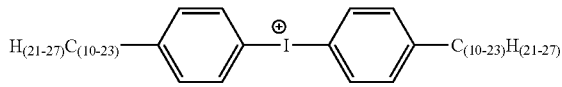

(VIII)

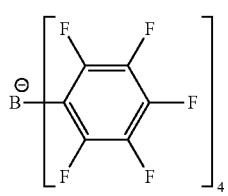

Onium salt can be used in combination with Guerbet alcohol, in order to avoid odor nuisance. The Guerbet alcohol can be of the formula (IX):

 (IX)

wherein
the symbols $R^9$ and $R^{10}$ are identical or different, and each stands for an alkyl radical having from 4 to 12 carbon atoms, and the Guerbet alcohol having a total number of carbon atoms of 10 to 20.

In a particular embodiment, the cationic photoinitiator C is selected among onium salts:
A) whose cationic entity is selected from:
the formula (X) onium salts;

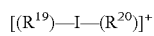 (X)

formula wherein:
radical $R^{19}$ is a radical with the formula (XI)

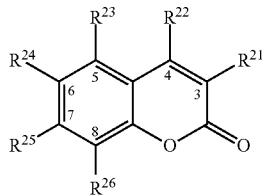

(XI)

wherein
the radical $R^{19}$ is linked to the iodine atom by a bond at one of positions 3-8, the $R^{21}$-$R^{26}$ substituent present at this position then being absent,
the substituents $R^{21}$-$R^{26}$ which are present, identical or different, stand for a hydrogen atom, or a $C_1$-$C_{12}$ branched or linear alkyl radical, or a ketone radical —(C=O)—$R^{15}$, or an —$OR^{15}$ radical,
$R^{15}$ being a radical selected from the group consisting of a hydrogen atom, a $C_1$-$C_{25}$ branched or linear alkyl radical, a $C_1$-$C_{25}$ branched or linear haloalkyl radical, a $C_6$-$C_{30}$ aryl radical, or an alkylaryl radical in which the alkyl part is $C_1$-$C_{25}$ branched or linear and the aryl part is $C_6$-$C_{20}$ said aryl radical and said alkylaryl radical being optionally substituted by one or several halogen atoms,
the $R^{20}$ radical stands for a $C_6$-$C_{20}$ aryl radical, or an alkylaryl radical in which the alkyl part is $C_1$-$C_{25}$ branched or linear and the aryl part is in $C_6$-$C_{30}$, radical $R^{20}$ being optionally substituted by one or several:
i) $C_1$-$C_{30}$ branched or linear alkyl group,
i) $C_1$-$C_{30}$ branched or linear haloalkyl group,
iii) $OR^{16}$ group,
iv) ketone group —(C=O)—$R^{16}$
v) ester or carboxylic acid group —(C=O)—O—$R^{16}$,
$R^{16}$ being a radical selected from the group consisting of a hydrogen atom, a $C_1$-$C_{25}$ branched or linear alkyl radical, a $C_1$-$C_{25}$ branched or linear haloalkyl radical a $C_6$-$C_{30}$ aryl radical, or an alkylaryl radical in which the alkyl part is $C_1$-$C_{25}$ branched or linear and the aryl part is $C_6$-$C_{30}$,
iv) nitro group,
vii) halogen atom, and
B) whose anionic entity is selected from $SbF_6^-$, $AsF_6^-$, $PF_6^-$, $ClO_4$ or a borate of formula (V);

 (V)

wherein Z, a, $R^4$ and b are as described above in formula (V),
Preferably:
the $R^{19}$ radical is linked to the iodine atom by a bond at position 3, the $R^{21}$ radical is therefore not present,
$R^{22}$ corresponds to a methyl group,
$R^{23}$ corresponds to a hydrogen atom, a methoxy group, a butoxy group, or a benzyloxy group,
$R^{24}$ corresponds to a hydrogen atom,
$R^{25}$ corresponds to a hydrogen atom, a benzyloxy group, a methoxy group, a butoxy group, or an ethoxy group,
$R^{26}$ corresponds to H, a benzyloxy group, or a methoxy group, and the radical $R^{20}$ stands for a phenyl group, a p-methylphenyl group, or a naphthyl group.
The borate anion is preferably selected from the group consisting of $[B(C_6F_5)_4]^-$, $[(C_6F_5)_2BF_2]^-$, $[B(C_6H_4CF_3)_4]^-$, $[B(C_6F_4OCH_3)_4]^-$, $[B(C_6H_3(CF_3)_2)_4]^-$, $[B(C_6H_3F_2)_4]^-$, $[C_6F_5BF_3]^-$, and mixtures thereof.

Advantageously, the onium salt with the formula (X) is a compound with the formula (XII)

[Chem. 15]

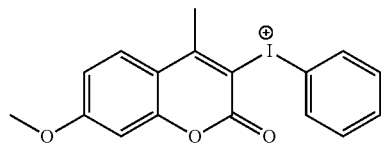

(XII)

and the anionic entity is selected from $SbF_6^-$, $PF_6^-$, et $[B(C_6F_5)_4]^-$.

In a particular embodiment, the cationic photoinitiator C is selected among onium salts:
A) whose cationic entity is selected from:
the formula (XIII) onium salts;

[Chem. 16]

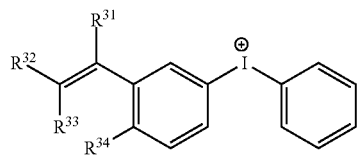

(XIII)

wherein
the substituents $R^{31}$, $R^{32}$ and $R^{33}$ are identical or different and each stand H, a $C_1$-$C_{12}$ branched or linear, —O—$R^{35}$, —CN, or —(C=O)—O—$R^{35}$ alkyl radical; —$R^{34}$ stands for —O—$R^{35}$;
$R^{35}$ being a radical selected from H and $C_1$-$C_{12}$ branched or linear alkyls; and B) whose anionic entity is selected from $SbF_6^-$, $AsF_6^-$, $PF_6^-$, $ClO_4$ or a borate of formula (V)

$$[(BZ_aR^4_b]^- \quad (V)$$

wherein Z, a, $R^4$ and b are as described above in formula (V).

By "heteroaryl having 5 to 15 ring atoms" is meant an aromatic polyunsaturated ring system having 5 to 15 ring atoms, comprising one or several condensed rings, where at least one of the rings is aromatic, and at least one of the ring atoms is a heteroatom selected from N, O and S.

By "halogen atom" is meant, according to the invention, an atom selected from the group consisting of fluorine, chlorine, bromine and iodine.

By "haloalkyl" is meant, according to the invention, an alkyl group substituted by one or several halogen atoms.

According to a specific embodiment, the amount of the cationic photoinitiator C is between 0.05 and 10% by weight relative to the total weight of the photocrosslinkable silicone composition Y, preferably between 0.1 and 5% by weight, and more preferably between 0.15 and 3% by weight.

According to a particular embodiment, the photocrosslinkable silicone composition Y is preferably free from any catalyst based on platinum, palladium, ruthenium or rhodium. By "free" is meant that the photocrosslinkable silicone composition Y comprises less than 0.1% by weight of a catalyst based on platinum, palladium, ruthenium or rhodium, preferably less than 0.01% by weight, and more preferably less than 0.001% by weight, relative to the total weight of the composition.

The photocrosslinkable silicone composition Y can comprise a filler D. The filler D makes it possible to improve the mechanical properties of the silicone elastomer item obtained once the method has been performed, while keeping good elastomeric properties. In particular, the filler D makes it possible to improve the modulus at break of the obtained silicone elastomer item, while keeping a high elongation at break.

Optionally provided filler D is preferably a mineral filler. Filler D can be a very finely divided product with an average pitem diameter of less than 0.1 µm. Filler D can in particular be siliceous. As regards siliceous materials, they can play the role of reinforcing or semi-reinforcing filler. The reinforcing siliceous fillers are selected from colloidal silicas, combustion and precipitation silica powders or mixtures thereof. These powders have an average pitem size generally less than 0.1 µm (micrometers) and a BET specific surface area greater than 30 m²/g, preferably between 30 and 350 m²/g. Semi-reinforcing siliceous fillers, such as diatomaceous earth or ground quartz, can also be employed. These silicas can be incorporated as such or after having been processed with organosilicon compounds which are usually used for this purpose. Among these compounds are methylpolysiloxanes such as hexamethyldisiloxane, octamethylcyclotetrasiloxane, methylpolysilazanes such as hexamethyldisilazane, hexamethylcyclotrisilazane, chlorosilanes such as dimethyldiohlorosilane, trimethylchlorosilane, methylvinyldichiorosilane dimethylvinylchlorosilane, alkoxysilanes such as dimethyldimethoxysilane dimethylvinylethoxysilane, trimethylmethoxysilane. As regards non-siliceous mineral materials, they can act as a semi-reinforcing or bulking mineral filler. Examples of such non-siliceous fillers which can be used alone or as a mixture are calcium carbonate, optionally surface-treated with an organic acid or with an ester of an organic acid, calcined clay, titanium oxide of the rutile type, oxides of iron, zinc, chromium, zirconium, or magnesium, the various forms of alumina (hydrated or not), boron nitride, lithopone, barium metaborate, barium sulfate and glass microbeads. These fillers are coarser with generally an average particle diameter greater than 0.1 µm and a specific surface area generally less than 30 m²/g. These fillers can have been surface-modified by processing with the various organosilicon compounds usually employed for this purpose. From a weight standpoint, it is preferred to implement an amount of filler of 0.1% to 50% by weight, preferably 1% to 20% by weight relative to all the constituents of the photocrosslinkable silicone composition Y.

Advantageously, the photocrosslinkable silicone composition Y comprises between 0.1 and 15% by weight of a filler D, preferably between 1 and 12%.

The photocrosslinkable silicone composition Y can include a photosensitizer E. The photosensitizer E absorbs energy from the irradiation and transfers it as energy or as an electron to the cationic photoinitiator C. Advantageously, the photosensitizer absorbs the irradiation energy at a higher wavelength than the cationic photoinitiator C, this makes it possible to use an irradiation source having a higher wavelength than that at which the photoinitiator cationic C is activated. Using a photosensitizer E is particularly suitable for the use of a LED lamp as an irradiation source, for example a LED lamp having a wavelength of 355, 365, 385 or 405 nm.

Advantageously, the photosensitizer E is selected from naphthalenes, anthracenes, pyrenes, phenothiazines, xanthones, thioxanthenes, benzophenones, acetophenone, carbazoles, anthraquinones, fluorenones, acylphosphine oxides, camphorquinone and mixtures thereof.

According to a particular embodiment, the photosensitizer E is selected from the group consisting of anthracene, naphthalene, perylene, pyrene, phenothiazine, 9,10-henantrenequinone, bianthrone, anthrone, 9-butoxyanthracene, 1-ethyl-9,10-dimethoxyanthracene, acridine orange, benzoflavin, 1-ethyl-9-ethoxyanthracene, 1-ethyl-9,10-dimethoxyanthracene, 2-isopropylthioxanthone, 2-chlorothioxanthone, 4,4'-bis(dimethylamino)benzophenone, 4,4-bis(diethylamino)benzophenone, 4-dimethylaminobenzophenone and mixtures hereof, preferably the photosensitizer E is 2-isopropylthioxanthone.

The photocrosslinkable silicone composition Y can comprise between 0.001 and 1% by weight of photosensitizer E relative to the total weight of the photocrosslinkable silicone composition Y, preferably between 0.002 and 0.5% by weight, and even more preferably between 0.005 and 0.1% by weight. The photocrosslinkable silicone composition Y can comprise between 0.001 and 0.1% by weight of photosensitizer E.

The photocrosslinkable silicone composition can comprise a photoabsorber F. The photoabsorber F makes it possible to reduce the irradiation penetration into the crosslinkable silicone composition Y layer and thus to improve the resolution of the obtained silicone elastomer item. It makes it possible to control the irradiation penetration depth (Dp) in the elastomer silicone Y layer.

The photocrosslinkable silicone composition Y comprises between 0.01 and 5% by weight of photoabsorber F relative to the total weight of the photocrosslinkable silicone composition Y, and preferably the photoabsorber F is selected from the group consisting of $TiO_2$, ZnO, hydroxyphenyl-s-triazines, hydroxyphenyl-benzotriazoles, cyano-acrylates, and mixtures thereof.

The photocrosslinkable silicone composition can also comprise organic or inorganic pigments G.

The photocrosslinkable silicone composition Y can also comprise at least one organic compound H comprising an epoxy function and/or a vinyloxy function.

The photocrosslinkable silicone composition Y can have a dynamic viscosity in the order in the order of 1 to 100.000 mPa·s at 25° C., generally in the order of 10 to 50,000 mPa·s at 25° C. and preferably in the order of 100 to 15,000 mPa·s at 25° C.

Advantageously, the photocrosslinkable silicone composition Y implemented in the process includes:
a. At least one linear organopolysiloxane A with the general formula (I)

[Chem. 17]

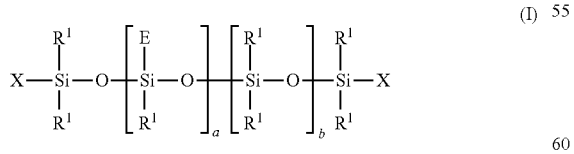

(I)

wherein each group $R^1$ is independently a monovalent radical comprising from 1 to 30 carbon atoms, preferably selected from alkyls having 1 to 8 carbon atoms and aryls having 6 to 12 carbon atoms, and more preferably from the methyl, ethyl, propyl, 3,3,3-trifluoropropyl, xylyl, tolyl and phenyl groups;

E is a group comprising an epoxy function, wherein the epoxy function is bonded to a silicon atom by a divalent radical comprising from 2 to 20 carbon atoms and optionally 1 or several heteroatoms, preferably oxygen;
each group X is independently $R^1$ or E;
a+b≥150; preferably 2000≥a+b≥150;
said organopolysiloxane A having at least 2 groups E comprising an epoxy function, and
said organopolysiloxane A having a molar content in epoxy function of less than or equal to 18 mmol/100 g of organopolysiloxane A, preferably less than or equal to 15 mmol/100 g of organopolysiloxane A;

b. Optionally at least one linear organopolysiloxane B with the general formula (I) wherein
a+b≤100; preferably 1≤a+b≤100;
said organopolysiloxane B having at least 2 groups E comprising an epoxy function, and
said organopolysiloxane B having a molar content in epoxy function greater than or equal to 20 mmol/100 g of organopolysiloxane B;

c. At least one cationic photoinitiator C;
d. Optionally, a filler D,
e. Optionally a photosensitizer E, and
f. Optionally a photoabsorber F.

Photocrosslinkable Silicone Composition Y'

The invention also relates to a photocrosslinkable silicone composition Y' Including:
a. At least 75% in weight of linear organopolysiloxane A' with the general formula (I)

[Chem. 18]

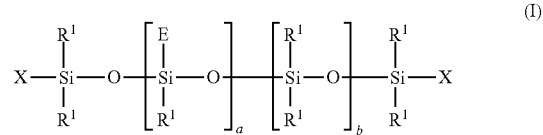

(I)

wherein each group $R^1$ is independently a monovalent radical comprising from 1 to 30 carbon atoms, preferably selected from alkyls having 1 to 8 carbon atoms and aryls having 6 to 12 carbon atoms, and more preferably from the methyl, ethyl, propyl, 3,3,3-trifluoropropyl, xylyl, tolyl and phenyl groups;
E is a group comprising a canonically polymerizable and/or crosslinkable function, preferably an epoxy or vinyloxy function, wherein the cationically polymerizable and/or crosslinkable function is linked to a silicon atom via a divalent radical comprising from 2 to 20 carbon atoms and optionally 1 or several heteroatoms, preferably oxygen;
each group X is independently $R^1$ or E;
a+b≥200; preferably 2000≥a+b≥200
said organopolysiloxane A' having at least 2 groups E with a function which can be cationically polymerized and/or crosslinked, and
said organopolysiloxane A' having a molar content in cationically polymerizable and/or crosslinkable function of less than or equal to 18 mmol/100 g of organopolysiloxane A', preferably less than or equal to 15 mmol/100 g of organopolysiloxane A';

b. Between 1 and 20% in weight of a linear organopolysiloxane B' with the general formula (I) wherein a+b≤150; preferably 1≤a+b≤100;

said organopolysiloxane B' having at least 2 groups E comprising a function which can be cationically polymerized and/or crosslinked, preferably an epoxy or vinyloxy function, and said organopolysiloxane B' having a molar content in cationically polymerizable and/or crosslinkable function of greater than or equal to 20 mmol/100 g of organopolysiloxane B'; and c. At least one cationic photoinitiator C.

The photocrosslinkable silicone composition Y' is capable of being crosslinked to a silicone elastomer by photopolymerization.

The molar content in cationically polymerizable and/or crosslinkable function of the organopolysiloxane A' of less than or equal to 18 mmol/100 g of organopolysiloxane A', preferably less than or equal to 15 mmol/100 g of organopolysiloxane A'. The molar content in cationically polymerizable and/or crosslinkable function can for example be between 0.5 and 18 mmol/100 g of organopolysiloxane A, or between 1 and 15 mmol/100 g of organopolysiloxane A'.

In a particular embodiment, the organopolysiloxane of formula A' is an organopolysiloxane of formula (I) where 1000≥a+b≥200.

Organopolysiloxane A' consists of siloxyl units "D" selected from the group consisting of siloxyl units D: $R^1_2SiO_{2/2}$ and $D^E$: $ER^1SiO_{2/2}$, and siloxyl units "M" selected from the group consisting of siloxyl units $M^E$: $ER^1SiO_{1/2}$. The symbols $R^1$ and E are as described above.

The linear organopolysiloxane A' preferably comprises 2 groups E comprising a cationically polymerizable and/or crosslinkable function.

Advantageously, the organopolysiloxane A' is an organopolysiloxane with the formula (I) wherein a=0. The groups E comprising a cationically polymerizable and/or crosslinkable function are then at the end of the chain and the organopolysiloxane A can have a general formula $M^E D_x M^E$ with x≥200.

The organopolysiloxane A' can be an oil with a dynamic viscosity in the order of 1 to 100,000 mPa·s at 25° C., generally in the order of 10 to 70,000 mPa·s at 25° C., and preferably in the order of 10 to 30,000 mPa·s at 25° C., and even more preferably in the order of 500 to 20,000 mPa·s at 25° C.

The photocrosslinkable silicone composition Y' comprises at least 75% by weight of organopolysiloxane A' relative to the total weight of the photocrosslinkable silicone composition Y', preferably between 75 and 99% by weight, and more preferably between 75 and 90% by weight.

The linear organopolysiloxane B' has a shorter chain than the organopolysiloxane A' and a higher molar content in cationically polymerizable and/or crosslinkable function. This makes it possible to improve the mechanical properties of the silicone elastomer obtained at the end of the photopolymerization, while keeping good elastomeric properties. Indeed, the modulus at break and the hardness of the obtained silicone elastomer are increased, while keeping a high elongation at break.

The molar content in cationically polymerizable and/or crosslinkable function of organopolysiloxane B' is greater than or equal to 20 mmol/100 g of organopolysiloxane B', preferably greater than or equal to 50 mmol/100 g of organopolysiloxane B', and more preferably greater than or equal to 80 mmol/100 g of organopolysiloxane B'. The molar content in cationically polymerizable and/or crosslinkable function of the organopolysiloxane B' can for example be between 20 and 500 mmol/100 g, or between 50 and 250 mmol/100 g of organopolysiloxane B'.

Organopolysiloxane B' consists of siloxyl units "D" selected from the group consisting of siloxyl units D: $R^1_2SiO_{2/2}$ and $D^E$: $ER^1SiO_{2/2}$, and siloxyl units "M" selected from the group consisting of siloxyl units $M^E$: $ER^1_2SiO_{1/2}$. The symbols $R^1$ and E are as described above.

The linear organopolysiloxane B' preferably comprises 2 groups E comprising a cationically polymerizable and/or crosslinkable function.

In a particular embodiment, the organopolysiloxane B' is an organopolysiloxane of formula (I) where a+b≤75; preferably 1≤a+≤75.

Advantageously, the organopolysiloxane B' is an organopolysiloxane with the formula (I) wherein a=0. The groups E comprising a cationically polymerizable and/or crosslinkable function are then at the end of the chain and the organopolysiloxane B' can have a general formula $M^E D_x M^E$ with x≤100, preferably x≤75.

The organopolysiloxane B' can be an oil with a dynamic viscosity in the order of 1 to 100,000 mPa·s at 25° C., generally in the order of 5 to 70,000 mPa·s at 25° C., and preferably in the order of 10 to 10,000 mPa·s at 25° C.

The photocrosslinkable silicone composition Y' comprises between 1 and 20% by weight of the organopolysiloxane B' relative to the total weight of the photocrosslinkable silicone composition Y', preferably between 5 and 15% by weight.

The group E cationically polymerizable and/or crosslinkable function is preferably selected among epoxy, vinyloxy, oxetane and dioxolane functions. Advantageously, the group E cationically polymerizable and/or crosslinkable function is an epoxy or vinyloxy function, preferably an epoxy function.

When the polymerizable and/or crosslinkable function by the cationic route of group E is a epoxy function, the groups E of the organopolysiloxane A' and/or of the organopolysiloxane B' are preferably selected from the following groups:

[Chem. 19]

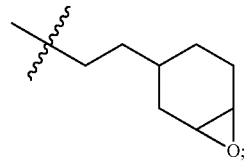

[Chem. 20]

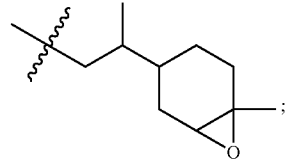

[Chem. 21]

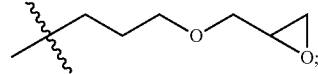

[Chem. 22]

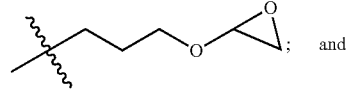

and

[Chem. 23]

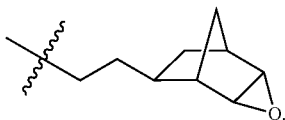

The wavy line stands for where the group is bonded to a silicon atom of the organopolysiloxane.

When the polymerizable and/or crosslinkable function by the cationic route of group E is a vinyloxy function, the groups E of the organopolysiloxane A' and/or of the organopolysiloxane B' are of formula (II):

wherein G stands for a divalent radical comprising from 2 to 20 carbon atoms and optionally 1 or several heteroatoms, preferably oxygen.

Preferably, the vinyloxy group is selected from the following groups:
—(CH$_3$)$_2$—O—CH=CH$_2$;
—O—(CH$_2$)$_4$—O—CH=CH$_2$, and
—(CH$_2$)$_3$—O—R$^{11}$—O—CH=CH$_2$, wherein R$^{11}$ is a divalent radical selected from C$_1$-C$_{12}$ branched or linear alkylene, and C$_6$-C$_{12}$ arylenes, preferably phenylene, the arylenes being optionally substituted with one, two or three C$_1$-C$_6$ alkyl groups.

Preferably, the organopolysiloxane A' and/or the organopolysiloxane B' is of formula (III):

[Chem. 24]

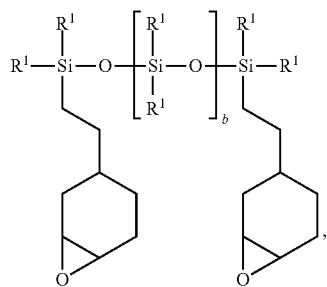

wherein R$^1$ is as described above, R1 being preferably a methyl group. In the case of organopolysiloxane A', b is ≥150, preferably b≥200, and in the case of organopolysiloxane B', b is ≤100, preferably b≤75.

According to a specific embodiment, the amount of the cationic photoinitiator C is between 0.05 and 10% by weight relative to the total weight of the photocrosslinkable silicone composition Y, preferably between 0.1 and 5% by weight, and more preferably between 0.15 and 3% by weight. The cationic photoinitiator C is as described above for the photocrosslinkable silicon composition Y.

According to a particular embodiment, the photocrosslinkable silicone composition Y' is preferably free from any catalyst based on platinum, palladium, ruthenium or rhodium. By "free" is meant that the photocrosslinkable silicone composition Y' comprises less than 0.1% by weight of a catalyst based on platinum, palladium, ruthenium or rhodium, preferably less than 0.01 by weight, and more preferably less than 0.001% by weight, relative to the total weight of the composition.

The photocrosslinkable silicone composition Y' can comprise a filler D. The filler D makes it possible to improve the mechanical properties of the silicone elastomer obtained after crosslinking, while keeping good elastomeric properties. Indeed, the modulus at break of the obtained silicone elastomer is increased, while keeping a high elongation at break. The filler D can be as described above for the photocrosslinkable silicone composition Y. The photocrosslinkable silicone composition Y' can comprise 1% and 50% by eight, preferably between 1% and 20% by weight relative to all the constituents of the photocrosslinkable silicone composition Y'.

Advantageously, the photocrosslinkable silicone composition Y' comprises between 0.1 and 15% by weight of a filler D, preferably between 1 and 12%.

The photocrosslinkable silicone composition Y' can include a photosensitizer E. The photosensitizer E absorbs energy from the irradiation and transfers it as energy or as an electron to the cationic photoinitiator C. Advantageously, the photosensitizer absorbs the irradiation energy at a higher wavelength than the cationic photoinitiator C, this makes it possible to use an irradiation source having a higher wavelength than that at which the photoinitiator cationic C is activated. The photosensitizer E is as described above for the photocrosslinkable composition Y. The photocrosslinkable silicone composition Y' can comprise between 0.001 and 0.5% by weight of the photosensitizer E relative to the total weight of the photocrosslinkable silicone composition Y', preferably between 0.005 and 0.1% by weight. The photocrosslinkable silicone composition Y' can comprise between 0.001 and 0.1% by weight of photosensitizer E.

The photocrosslinkable silicone composition Y' can comprise a photoabsorber F. The photoabsorber F makes it possible to reduce the irradiation penetration into the crosslinkable silicone composition Y' layer and thus to improve the irradiation. It makes it possible to control the irradiation penetration depth (Dp) in the photocrosslinkable silicone elastomer Y' layer. The photocrosslinkable silicone composition Y' can comprise between 0.01 and 5% by weight of the photoabsorber F relative to the total weight of the photocrosslinkable silicone composition Y'. The photoabsorber F can be as described for the photocrosslinkable composition Y.

The photocrosslinkable silicone core position Y' can also comprise organic or inorganic pigments G.

The photocrosslinkable silicone composition Y' can also comprise at least one organic compound H comprising an epoxy function and; or a vinyloxy function.

The photocrosslinkable silicone composition N' can have a dynamic viscosity in the order in the order of 1 to 100,000 mPa·s at 25° C., generally in the order of 10 to 50,000 mPa·s at 25° C., and preferably in the order of 100 to 15,000 mPa·s at 25° C.

Advantageously, the photocrosslinkable silicone composition Y' includes:
a. At least 75% in weight of a near organopolysiloxane A' with the general formula (I)

[Chem. 25]

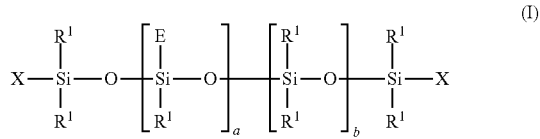

wherein each group $R^1$ is independently a monovalent radical comprising from 1 to 30 carbon atoms, preferably selected from alkyls having 1 to 8 carbon atoms and aryls having to 12 carbon atoms, and more preferably from the methyl, ethyl, propyl, 3,3,3-trifluoropropyl, xylyl, tolyl and phenyl groups;

E is a group comprising an epoxy function, wherein the epoxy function is bonded to a silicon atom by a

[Chem. 26]

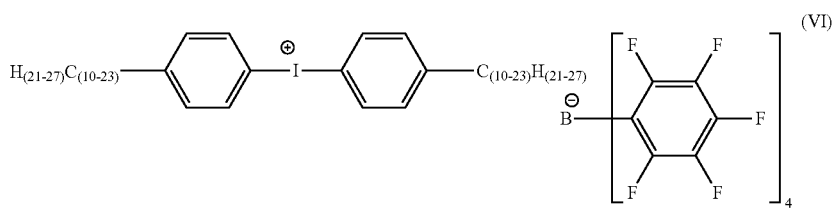

(VI)

divalent radical comprising from to 20 carbon atoms and optionally 1 or several heteroatoms, preferably oxygen;

each group X is independently $R^1$ or E;

a+b≥200; preferably 2000≥a+b≤200;

said organopolysiloxane A' having at least 2 groups E with an epoxy function, and said organopolysiloxane A' having a molar content in epoxy function of less than or equal to 18 mmol/100 g of organopolysiloxane A', preferably less than or equal to 15 mmol/100 g of organopolysiloxane A';

b. Between 1 and 20% in weight of linear organopolysiloxane B' with the general formula (I) wherein a+b≤150; preferably 1≤a+b≤100;

said organopolysiloxane B' having at least 2 groups E comprising an epoxy function, and said organopolysiloxane B' having a molar content in epoxy function of greater than or equal to 20 mmol/100 g of organopolysiloxane B'; and c. At least one cationic photoinitiator C.

The invention also relates to the use of a photocrosslinkable silicone composition Y' for additive manufacturing of a silicone elastomer item. Advantageously, the additive manufacturing is carried out by photopolymerization in a tank, preferably by laser stereolithography (SLA), digital light processing (DLP) 3D printing, or continuous liquid interface production (or CLIP).

The invention also relates to an elastomer silicone obtained by crosslinking the photocrosslinkable silicone composition Y'.

EXAMPLES

Used Base Materials

Oil A1: organopolysiloxane with an epoxy function of formula $M^{Epoxy}D_xM^{Epoxy}$ with x=590, having a molar mass of 44,000 g/mol, a viscosity of 9,150 mPa·s and a molar content in epoxy function of 4.55 mmol per 100 g of oil A1;

Oil A2: organopolysiloxane with an epoxy function of formula $M^{Epoxy}D_xM^{Epoxy}$ with x=227, having a molar mass of 17,200 g/mol, a viscosity of 1,000 mPa·s and a molar content in epoxy function of 11.53 mmol per 100 g of oil A2;

Oil A3: organopolysiloxane with an epoxy function of formula $MD_{530}D^{Epoxy}{}_9M$, having a molar mass of 41,600 g/mol, a viscosity of 5,000 mPa·s and a molar content in epoxy function of 21.64 mmol per 100 g of oil A3;

Cationic photoinitiator C: Cationic photoinitiator with the formula (VI)

in octyldodecanol;

Photosensitizer E: ITX Isopropylthioxanthone (CAS no 5495-84-1);

Oil B: organopolysiloxane with an epoxy function of formula $M^{Epoxy}D_{21}M^{Epoxy}$, having a molar mass of 1,950 g/mol, a viscosity of 50 mPa·s and a molar content in epoxy function of 102.6 per 100 g of oil B Filler D1: Pyrogenic silica treated with octamethyltetrasiloxane;

Filler D2: Non treated silica (A200):

Photoabsorber F: $TiO_2$ (KronoClean 7000).

Different compositions have been prepared with these products. All the amounts are expressed as a percentage by weight relative to the total weight of the composition.

Compositions 1-9 and Comparative Composition 1

Compositions 1-9 and comparative composition 1 were prepared by mixing all the components manually or with a speed mixer. The compositions were then degassed using a vacuum bell for 5 to 10 min. A part of each of the compositions was cast in a 2-mm-thick mold and was passed through a laboratory unit consisting of a conveyor equipped with UV lamps to obtain plates which were used for the mechanical tests after crosslinking.

Operating conditions of the laboratory unit:

i. Speed: 10 m/min ii. Lamp: H-bulb, medium pressure mercury vapor bulb producing a conventional mercury spectral output, iii. Power: 15 A iv. No product inerting v. 1 run The mechanical properties of these compositions were measured on an INSTRON 5544 dynamometer at 500 mm/min according to the ASTM D412 standard—method A.

The different compositions and the results of the mechanical tests a shown in Table 1.

TABLE 1

| | Compo. 1 | Compo. 2 | Compo. 3 | Compo. 4 | Compo. 5 | Compo. 6 | Compo. 7 | Compo. 8 | Compo. 9 | Comp. Compo. 1 |
|---|---|---|---|---|---|---|---|---|---|---|
| Components | | | | | | | | | | |
| Oil A1 | 99% | | 40% | 94% | 84% | | | | | |
| Oil A2 | | 99% | 49% | | | 94% | 84% | 89% | 89% | |
| Oil A3 | | | | | | | | | | 99% |
| Oil B | | | | 5% | 15% | 5% | 15% | | | |
| Filler D1 | | | | | | | | 10% | | |
| Filter D2 | | | | | | | | | 10% | |
| Photo-initiator C | 1% | 1% | 1% | 1% | 1% | 1% | 1% | 1% | 1% | 1% |
| Properties | | | | | | | | | | |
| Thickness (mm) | 1.5 | 1.37 | 1.44 | 1.33 | 1.41 | 1.33 | 1.54 | 1.71 | 1.61 | 1.58 |
| Elongation at break (%) | 254 | 125 | 180 | 137 | 100 | 141 | 100 | 200 | 225 | 25 |
| 100% modulus (MPa) | 0.14 | 0.34 | 0.6 | 0.23 | 0.41 | 0.38 | 0.59 | 0.91 | 0.73 | N/A* |
| Modulus at break (MPa) | 0.24 | 0.39 | 0.99 | 0.28 | 0.4 | 0.47 | 0.59 | 1.61 | 1.56 | 0.31 |
| Hardness S00 | 51 | 61 | N/A | 68 | 75 | 75 | 80 | N/A | N/A | N/A |
| Viscosity mPa·s | 13 000 | 1 200 | N/A | 12 000 | 8 000 | 1 140 | 900 | N/A | N/A | N/A |

*N/A: not measured

These results show that all of the compositions 1-9 according to the invention are elastomers which exhibit a high elongation at break, of approximately 100%, or even more. These results also show that it is necessary to use a composition comprising a long-chain organopolysiloxane having a low content in cationically polymerizable and/or crosslinkable function in order to achieve good elastomeric properties. Indeed, when an organopolysiloxane having a high content in cationically polymerizable and/or crosslinkable function is used, the elongation at break is very low, it therefore does not have good elastomeric properties (comparative composition 1).

Adding a shorter oil B having a higher molar content in cationic polymerizable and/or crosslinkable function (compositions 4-7) or adding a filler (compositions 8-9) makes it possible to improve the mechanical properties of the obtained elastomers, while keeping good elastomeric properties. This is because the modulus at break and the hardness are improved and the elongation at break remains high for these compositions.

Compositions 10-12

Compositions 10-12 were prepared in the same way by mixing all the components and then degassing the obtained compositions. In the case of composition 10, the irradiation was carried out with a Mercury UV lamp, and in the case of compositions 11 and 12, with an LED lamp having a wavelength of 365 nm.

The reactivity under UV mercury lamp irradiation and at 365 nm was measured by photo-DSC (Metier Toledo LA 61310) as follows: irradiation of the sample after 1 minute of stabilization with a Hamamatsu LC8-02 lamp set at 1%. For irradiations in the 365 nm UV LED range, a Hamamatsu A9616-07 filter is placed (UV dose at 365 nm measured under these conditions: 0.5 mW/cm$^2$).

The different compositions and the results of the mechanical tests shown in Table 2.

TABLE 2

| | Compo. 10 Mercury UV lamp | Compo. 11 LED lamp | Compo. 12 LED lamp |
|---|---|---|---|
| Components | | | |
| Oil A2 | 89.15% | 89.15 | 89.12% |
| Oil B | 10% | 10% | 10% |
| Photosensitizer E | | | 0.0267% |
| Cationic photoinitiator C | 0.85% | 0.85 | 0.85% |
| Properties | | | |
| Crosslinking Y/N (Reaction time in min) | Yes (0.41) | No | Yes (1.53) |

These results show that it s possible to use different types of irradiation to crosslink the compositions according to the invention. In the case of irradiation by LED having a 365 nm wavelength, it is necessary to use a photosensitizer for the crosslinking reaction to take place (compositions 11 and 12).

Compositions 13-16

Compositions 13-15 were prepared in the same way by mixing the components and then degassing the obtained compositions.

The effective depth of ray penetration (depth to which the composition crosslinks) was measured by setting the exposure time to 1 second or 3 seconds and varying the power of the UV source for this fixed irradiation time. Once the film is formed, it is measured using a micrometer which makes it possible to determine the depth of the layer formed as a function of the UV dose for each composition.

The different compositions and the obtained results are presented in Table 3.

TABLE 3

| | Compo. 13 | Compo. 14 | Compo. 15 | Compo. 16 |
|---|---|---|---|---|
| Components | | | | |
| Oil A2 | 79.22% | 78.80% | 79.20% | 78.78 |
| Oil B | 10.00% | 9.95% | 9.99% | 9.94 |
| Filler D2 | 10.00% | 9.95% | 9.99% | 9.94 |
| Photosensitizer E | 0.01% | 0.01% | 0.050% | 0.04 |
| Photoinitiator C | 0.77% | 0.80% | 0.77% | 0.80 |
| Photoabsorber F | | 0.50% | | 0.50 |
| Properties | | | | |
| Crosslinking depth in micrometers (irradiation with a UV lamp having a power of 95.9 mW/cm2 for 1 s) | | | 470 | 300 |
| Crosslinking depth in micrometers (irradiation with a UV lamp having a power of 76.3 mW/cm2 for 3 s) | 1 000+ | 470 | | |

These results show that it is possible to adapt the crosslinking depth. Adding a photoabsorber F in the composition allows reducing ray penetration and thus to obtaining a better printing resolution. This makes it possible to obtain formulations which are compatible with 3D printing, and which have good printing resolution.

Furthermore, the mechanical properties of composition 13 were also measured according to the method described above. The results are shown in Table 4.

TABLE 4

| Properties | Compo. 13 |
|---|---|
| Elongation at break (%) | 145 |
| 100% modulus (MPa) | 1.73 |
| Modulus at break (MPa) | 2.47 |
| Hardness (Shore A) | 37 |
| Viscosity mPa · s | 6 000 |

These results show that it is possible to obtain formulations which are compatible with 3D printing, for printing elastomer c parts having good mechanical properties and a good definition.

The invention claimed is:

1. Additive manufacturing method for producing a silicone elastomer item, said method including the following steps:
   i. Implementing a photocrosslinkable silicone composition Y and an irradiation source, said photocrosslinkable silicone composition Y comprising:
   a. At least one linear organopolysiloxane A with the general formula (I)

[Chem 27]

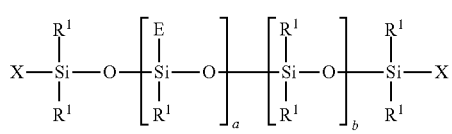

(I)

wherein each group $R^1$ is independently a monovalent radical comprising from 1 to 30 carbon atoms;
E is a group comprising a cationically polymerizable and/or crosslinkable function, wherein the cationically polymerizable and/or crosslinkable function is linked to a silicon atom via a divalent radical comprising from 2 to 20 carbon atoms and optionally 1 or several heteroatoms;
each group X is independently $R^1$ or E;

$a+b \geq 150$;

said organopolysiloxane A having at least 2 groups E with a cationically polymerizable and/or crosslinkable function, and
said organopolysiloxane A having a molar content in cationically polymerizable and/or crosslinkable function of less than or equal to 18 mmol/100 g of organopolysiloxane A;
   b. Optionally at least one linear organopolysiloxane B with the general formula (I) wherein $a+b \leq 100$;

said organopolysiloxane B having at least 2 groups E with a cationically polymerizable and/or crosslinkable function,
and
said organopolysiloxane B having a molar content in cationically polymerizable and/or crosslinkable function of greater than or equal to 20 mmol/100 g of organopolysiloxane B;
   c. At least one cationic photoinitiator C;
   d. Optionally, a filler D,
   e. Optionally a photosensitizer E, and
   f. Optionally a photoabsorber F,
   ii. Selectively irradiating at least a portion of the photocrosslinkable silicone composition Y using the irradiation source to form a portion of the silicone elastomer item; and
   iii. Repeating step ii) a sufficient number of times to produce the silicone elastomer item.

2. Additive manufacturing method for producing a silicone elastomer item according to claim 1, wherein the photocrosslinkable silicone composition Y comprises at least 75% by weight of organopolysiloxane A.

3. Additive manufacturing method for producing a silicone elastomer item according to claim 1, wherein the organopolysiloxane A is an organopolysiloxane with the formula (I) where a=0.

4. Additive manufacturing method for producing a silicone elastomer item according to claim 1, wherein the photocrosslinkable silicone composition Y comprises between 1 and 20% by weight of the organopolysiloxane B.

5. Additive manufacturing method for producing a silicone elastomer item according to claim 1, wherein the cationically polymerizable and/or crosslinkable function of group E is an epoxy function.

6. Additive manufacturing method for producing a silicone elastomer item according to claim 1, wherein the amount of cationic photoinitiator C is between 0.05 and 10% by weight of the photocrosslinkable silicone composition Y.

7. Additive manufacturing method for producing a silicone elastomer item according to claim 1, wherein the cationic photoinitiator C is selected from onium salts.

8. Additive manufacturing method for producing a silicone elastomer item according to claim 1, wherein the photocrosslinkable silicone composition Y comprises between 0.1 and 15% by weight of a filler D.

9. Additive manufacturing method for producing a silicone elastomer item according to claim 1 wherein the photocrosslinkable silicone composition Y comprises between 0.001 and 0.1% by weight of photosensitizer E.

10. Additive manufacturing method for producing a silicone elastomer item according to claim 1, wherein the photocrosslinkable silicone composition Y comprises between 0.01 and 5% by weight of photoabsorber F.

11. Additive manufacturing method for producing a silicone elastomer item according to claim 1, wherein the irradiation source is an LED lamp.

* * * * *